(12) United States Patent
Li et al.

(10) Patent No.: US 11,330,223 B2
(45) Date of Patent: May 10, 2022

(54) DISPLAY APPARATUS

(71) Applicant: HISENSE VISUAL TECHNOLOGY CO., LTD., Shandong (CN)

(72) Inventors: Benyou Li, Shandong (CN); Shou Tian, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 229 days.

(21) Appl. No.: 16/792,387

(22) Filed: Feb. 17, 2020

(65) Prior Publication Data

US 2020/0267344 A1 Aug. 20, 2020

Related U.S. Application Data

(63) Continuation of application No. PCT/CN2020/071490, filed on Jan. 10, 2020.

(30) Foreign Application Priority Data

Feb. 19, 2019 (CN) .......................... 201910121878.3

(51) Int. Cl.
*G06F 3/038* (2013.01)
*H04N 5/63* (2006.01)
(Continued)

(52) U.S. Cl.
CPC ................ *H04N 5/63* (2013.01); *G06F 1/28* (2013.01); *G09G 1/005* (2013.01); *G09G 2330/02* (2013.01); *G09G 2330/021* (2013.01)

(58) Field of Classification Search
CPC . H04N 5/63; G06F 1/28; G09G 1/005; G09G 2330/02
(Continued)

(56) References Cited

U.S. PATENT DOCUMENTS

2004/0257337 A1 12/2004 Yoshikazu et al.
2006/0119289 A1 6/2006 Tsai
(Continued)

FOREIGN PATENT DOCUMENTS

CN 101043605 A 9/2007
CN 101667774 A 3/2010
(Continued)

OTHER PUBLICATIONS

State Intellectual Property Office of the People's Republic of China, Office Action and Search Report Issued in Application No. 2019101218783, dated Apr. 3, 2020, 11 pages, (Submitted with Machine Translation).

(Continued)

*Primary Examiner* — Jonathan M Blancha
(74) *Attorney, Agent, or Firm* — Crowell & Moring LLP

(57) ABSTRACT

The present disclosure describes a display apparatus. The display apparatus includes a power source, a power supply circuit, a load and a control circuit. The power source is configured to supply electric power to the load. The power supply circuit connects the power source and the load respectively, and configured to turn on or off an electric path between the power source and the load. The control circuit connects with the power source and the power supply circuit respectively and configured to control the power source circuit to determine whether the power supply supplies power to the load.

6 Claims, 11 Drawing Sheets

(51) Int. Cl.
*G06F 1/28* (2006.01)
*G09G 1/00* (2006.01)

(58) Field of Classification Search
USPC .......................................................... 345/211
See application file for complete search history.

(56) References Cited

U.S. PATENT DOCUMENTS

| | | | |
|---|---|---|---|
| 2008/0180870 A1* | 7/2008 | Tu ........................ | G09G 3/3696 |
| | | | 361/93.9 |
| 2009/0201619 A1* | 8/2009 | Mayell .................. | H02H 9/001 |
| | | | 361/93.9 |
| 2011/0043711 A1 | 2/2011 | Tsuda et al. | |
| 2012/0326619 A1* | 12/2012 | Meng .................... | G09G 3/3611 |
| | | | 315/245 |
| 2019/0213934 A1 | 7/2019 | Xu et al. | |

FOREIGN PATENT DOCUMENTS

| CN | 201438291 U | 4/2010 |
|---|---|---|
| CN | 101727853 A | 6/2010 |
| CN | 202261591 U | 5/2012 |
| CN | 206271398 U | 6/2017 |
| CN | 107301849 A | 10/2017 |
| CN | 108109568 A | 6/2018 |
| CN | 1108109568 A | 6/2018 |
| CN | 109905619 A | 6/2019 |

OTHER PUBLICATIONS

ISA State Intellectual Property Office of the People's Republic of China, International Search Report Issued in Application No. PCT/CN2020/071490, dated Mar. 31, 2020, WIPO, 4 pages.

European Patent Office, Extended European Search Report Issued in Application No. 20759042.3, dated Mar. 24, 2021, Germany, 10 pages.

ISA State Intellectual Property Office of the People's Republic of China, Written Opinion of the International Searching Authority Issued in Application No. PCT/CN2020/071490, dated Dec. 3, 2020, WIPO, 5 pages.

* cited by examiner

DISPLAY APPARATUS

CROSS REFERENCE TO RELATED APPLICATIONS

This application is a continuation application of International Application No. PCT/CN2020/071490 filed on Jan. 10, 2020, which claims priority to Chinese Patent Application No. 201910121878.3 filed on Feb. 19, 2019, the entire contents of both of which are incorporated herein by reference.

TECHNICAL FIELD

The present disclosure relates to circuit technologies and in particular to a display apparatus.

BACKGROUND

Along with development of electronic technologies, people will use increasingly more electronic devices with display apparatuses in daily life, such as a mobile phone, a tablet computer, a laptop computer and a TV. These electronic devices visualize contents through the display apparatuses. When people use an electronic device, power sources of the electronic device is connected to an urban alternating current so that the urban alternating current supplies power to the panel of the electronic devices. The display apparatus may include but not limited to an electric apparatus such as a household appliances, an industrial appliance or a terminal communication device.

To prevent impulse voltages and impulse currents from damaging a load of the display apparatus due to instantaneous application on the load of the display apparatus upon startup of the panel, a peripheral circuit is generally added to the display apparatus. In this way, a power-on time of the load is prolonged when a power source is started, so as to achieve a slow power-on effect of the load. Thus, the load is protected against the impulse voltage and the impulse current.

However, because there is a the peripheral circuit with a "slow power on" feature, a power-off time of the load is also prolonged during a shutdown process of the display apparatus, resulting in a slow power-off. Generally, when the display apparatus is shut down, the load will be powered off quickly. If the load is powered off slowly, an actual voltage of the load is likely still above a working voltage of the load (that is, the load still can work) rather than below the working voltage of the load (that is, the load stops working) at a particular time interval during a power-off process. As a result, the time sequence of the entire display apparatus will be in a disorder, resulting in an abnormality of the display, such as black screen or frozen picture.

SUMMARY

A display apparatus according to some examples of the present disclosure includes a power source, a circuit board and a load. The power source supplies electric power to the load through the circuit board. The circuit board includes at least a power supply circuit and a control circuit. The power source is configured to supply electric energy to the load. The power supply circuit is in connection with the power source and the load and configured to turn on or off a passage between the power source and the load. The control circuit is in connection with the power source and the power supply circuit. The control circuit includes a capacitor, a first resistor, a second resistor, a charging circuit and a grounding switch. A first end of the capacitor and a first end of the first resistor are connected with the power source. A second end of the first resistor is connected with a first end of the charging circuit. A second end of the charging circuit is connected with a second end of the capacitor, a first end of the second resistor and the power supply circuit. A second end of the second resistor is connected with a first end of the grounding switch. A second end of the grounding switch is grounded. The control circuit is configured to control the power supply circuit to determine whether the power source supplies power to the load.

BRIEF DESCRIPTION OF THE DRAWINGS

To describe examples of the present disclosure more clearly, drawings for descriptions of the examples of the present disclosure will be briefly introduced below. It is apparent that the drawings described below are merely examples of the present disclosure and other drawings may be obtained by those of ordinary skill in the art based on these drawings in the examples of the present disclosure.

NUMERALS OF DRAWINGS

Figure 1A:
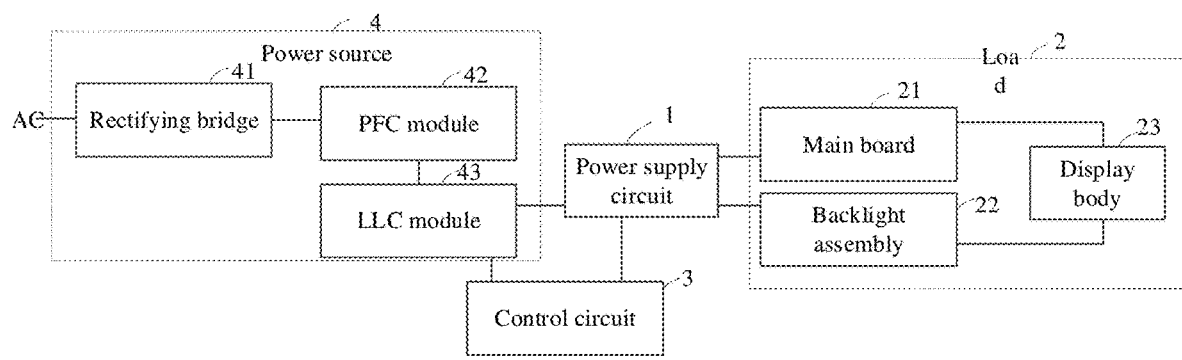
FIG. 1A is a schematic diagram illustrating an architecture of a TV power source according to some examples of the present disclosure.

1: a power supply circuit, 11: a first end of a power supply circuit, 12: a second end of a power supply circuit, 13: a third end of a power supply circuit;

2: a load, 21: a main board, 22: a backlight assembly, 23: a panel body;
3, a control circuit, 31: a capacitor, 32: a first resistor, 33: a second resistor, 34: a charging module, 35: a grounding switch, 36: an auxiliary module, 341: a third resistor, 342: a diode;
4: a power source, 41: a rectifying bridge, 42: a PFC module, 43: an LLC module;
210: a MOS transistor N1, 220: a VCC-Panel, 240: a +12V_IN;
231: a capacitor C1, 232: a triode V1, 235: a PANEL_ON/OFF, 236: a resistor R1, 238: a resistor R2; and
930: a fourth resistor R2.

DETAILED DESCRIPTION OF THE EMBODIMENTS

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly Example embodiments will now be described more fully with reference to the accompanying drawings.

As an example, an architecture of a power source of a TV is illustrated. FIG. 1A is a schematic diagram illustrating the architecture of the power source of the TV. In FIG. 1A, a display apparatus includes a power supply circuit 1, a load 2, a control circuit 3 and a power source 4. The power source 4 includes a rectifying bridge 41, a power factory correction (PFC) module 42 and a resonant conversion (LLC) module 43. The LLC module 43 includes a synchronous rectifying circuit (not shown in FIG. 1A). The PFC module 42 is connected to the LLC module 43, and the LLC module 43 is connected to the power supply circuit 1 and the control circuit 3 respectively.

The rectifying bridge 41 is configured to rectify an input alternating current and input a full-wave signal to the PFC module 42. Before being input to the PFC module 42, the alternating current power is connected to an Electromagnetic Interference (EMI) filter (not shown in FIG. 1A) to perform high frequency filtering for the input alternating current power.

The PFC module generally including a PFC inductor, a switching power device, and a PFC control chip is configured to perform power factor correction for the input alternating current power and output stable direct current busbar voltage (for example, 380V) to the LLC module 43. The PFC module 42 effectively improves a power factor of the power source and thus ensures the voltage and the current are in phase.

The LLC module 43 adopts a double-MOS transistor LLC circuit and the synchronous rectifying circuit is generally disposed in the LLC module 43. The synchronous rectifying circuit mainly includes a transformer, a controller, two MOS transistors, and a diode. Further, the LLC module 43 includes elements such as a pulse frequency modulation (PFM) circuit, a capacitor and an inductor. Specifically, the LLC module 43 performs voltage step-down or voltage step-up for a direct current busbar voltage input by the PFC module 42 and outputs a constant voltage to the load 2. Generally, the LLC module 43 outputs different types of voltages to satisfy the requirements of the load 2.

The power source 4 further includes a flyback module (not shown in FIG. 1A), and is configured to provide a power supply voltage and a standby power for the PFC module 42 and the LLC module 43.

The control circuit 3 is connected to the power source 4 and the power supply circuit 1 respectively, and configured to control the power supply circuit 1 to turn on or not, that is, control the electric energy output by the LLC module 43 to be supplied to the load 2 through the power supply circuit or not, thereby the load is started or shut down. Generally, the control circuit 3 receives a control signal from a main chip (not shown in FIG. 1A), so that the control circuit 3 is controlled by the main chip to control a working state of the power supply circuit 1.

The power supply circuit 1 is further connected to the LLC module and the load respectively. When the power supply circuit 1 is turned on, the LLC module 43 supplies power to the load 2. When the power supply circuit 1 is turned off, the LLC module 43 stops supplying power to the load 2. The power supply circuit 1 generally includes a switch element (not shown in FIG. 1A), for example, an MOS transistor. The control circuit 3 controls a conduction state of the MOS transistor by controlling voltages of a source electrode and a gate electrode of the MOS transistor.

The load 2 includes a main board 21, a backlight assembly 22 and a panel body 23 and so on. The main board 21 includes an element such as a control unit, and the main board is configured to receive a voltage output from the LLC module 43, encode a received audio and video signal and then input the encoded signal to the panel body 23. In an example, the main board 21 is supplied with a 12V voltage. The backlight assembly 22 receives the voltage output from the LLC module 43 to realize displaying of the panel body 23. The panel body 23 includes but not limited to a liquid crystal panel.

Figure 1B:
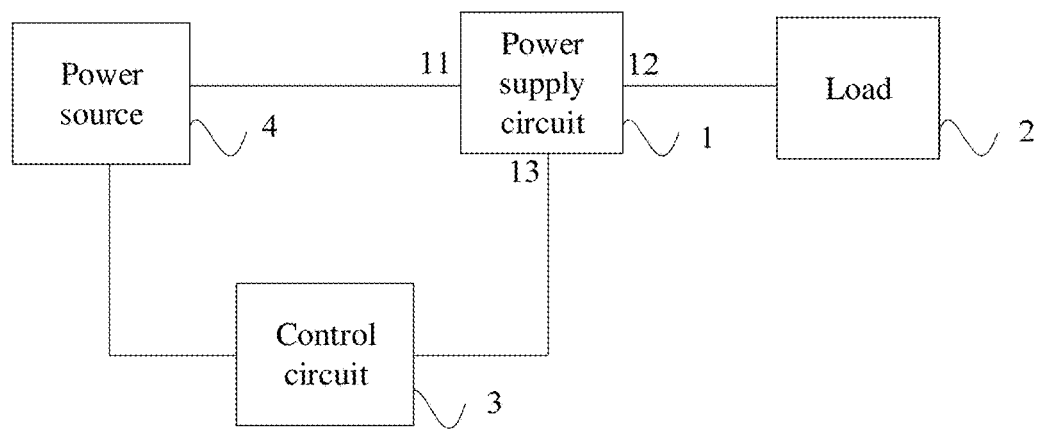
FIG. 1B is a schematic diagram illustrating an application scenario of a display apparatus according to some examples of the present disclosure.

FIG. 1B is a schematic diagram illustrating an application scenario of a display apparatus according to some examples of the present disclosure. FIG. 1B is obtained by simplifying FIG. 1A. As shown in FIG. 1B, the display apparatus according to some examples of the present disclosure includes a power source 4, a circuit board (not shown) and a load 2. The power source supplies power to the load 2 through the circuit board. The circuit board includes at least a power supply circuit 1 and a control circuit 3. The power source 4 is configured to supply electric energy. The power supply circuit 1 is connected to the power source 4 and the load 2 respectively to turn on or off a passage between the power source 4 and the load 2. The control circuit 3 is connected to the power source 4 and the power supply circuit 1 respectively and configured to control whether the power source 4 supplies power to the load 2 or not by turning on or cutting off the power supply circuit 1.

After the load 2 of the display apparatus is connected to the power source 4 through the power supply circuit 1, the power source 4 supplies power to the load 2 through the power supply circuit 1. The load 2 is, for example, a screen or TOCN of the display apparatus or the like. Here, the control circuit 3 is connected to the power source 4 and the power supply circuit 1 respectively, and configured to control whether the power supply circuit supplies power to the load 2 or not by connecting or disconnecting a first end 11 and a second end 12 of the power supply circuit 1. Specifically, when the control circuit 3 controls the first end 11 and the second end 12 of the power supply circuit 1 to be in a conduction state, the power source 4 supplies power to the load 2 through the power supply circuit 1. When the control circuit 3 controls the first end 11 and the second end 12 of the power supply circuit 1 to be in a disconnection state, the power source 4 and the load 2 are disconnected and the load 2 of the display apparatus is powered off.

Figure 2:
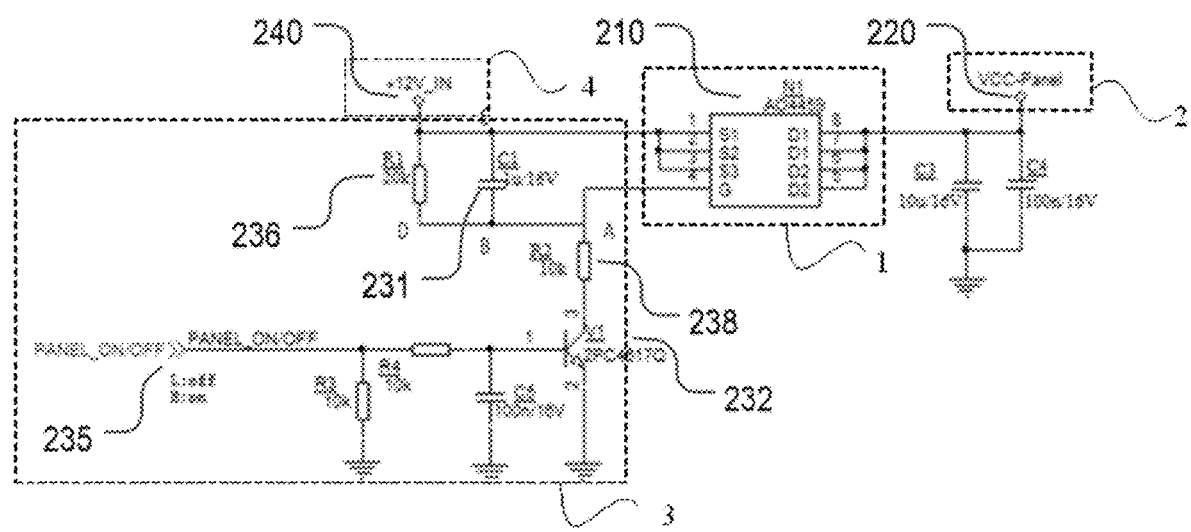
FIG. 2 is a schematic diagram illustrating a circuit of a display apparatus according to some examples of the present disclosure.

In an example, FIG. 2 is a schematic diagram illustrating a circuit of a display apparatus according to some examples of the present disclosure, which is a specific circuit implementation of the display apparatus of FIG. 1. In FIG. 2, +12V_IN 240 is an output interface of the power source 4, the voltage output from the power source 4 acts on the LLC module 43, so as to supply an alternating current passing through the LLC module 43 to the power supply circuit 1. In the above example, the output voltage is 12V, in other examples, the output voltage may be 5V, 18V and etc. According to different requirements of the load, different output interfaces are set for the power source 4. VCC-Panel 220 is an input interface of the load 2 of the display apparatus. The voltage of the VCC-Panel is configured to supply power to the load. In an example, the load 2 has a plurality of input interfaces which are connected to different loads (not shown in FIG. 1B) respectively. The power supply circuit 1 includes an MOS transistor N1 210. The MOS transistor N1 includes a source electrode (S), a gate electrode (G) and a drain electrode (D). When a voltage difference between the source electrode and the gate electrode reaches a conduction voltage drop of the MOS transistor, a path between the source electrode and the drain electrode of the MOS transistor N1 will be formed, causing the power source 4 to supply power for the load 2. In an example, the conduction voltage of the MOS transistor depends on the model of the MOS transistor N1. The MOS transistor N1 is connected to the control circuit 3 so that the MOS transistor N1 is controlled by the control circuit 3.

To prevent the impulse voltage and the impulse current of the power source from damaging the load of the display apparatus due to instantaneous application on the load of the display apparatus upon the power-on of the display apparatus, a capacitor, for example, a capacitor C1 shown in FIG. 2, is generally arranged in the control circuit 3. The power-on time of the load is prolonged thanks to a characteristic that a voltage across the capacitor cannot be abruptly changed, that is, by using charging and discharging time of the capacitor C1 231, thereby achieving the slow power-on effect of the load and protecting the load against the impulse voltage and the impulse current.

A first end of the capacitor C1 231 is connected with the interface +12V_IN of the power source 4 and a second end of the capacitor C1 is connected with the gate electrode of the MOS transistor N1. When the capacitor C1 is charged, the voltage of the second end will increase. Because the second end is connected with the gate electrode of the MOS transistor N1, the voltage of the gate electrode of the MOS transistor N1 will increase along with the charge of the capacitor C1. When the voltage across the capacitor C1 is in a balance state, that is, when the charge of the capacitor C1 is completed, a branch where the capacitor C1 is located is substantially equivalent to an open circuit. Similarly, when the capacitor C1 is in a discharge process, the voltage of the second end will decrease and the voltage of the gate electrode of the MOS transistor N1 also decreases. After the capacitor C1 completes the discharge process, the branch where the capacitor C1 is located is substantially equivalent to an open circuit. Since the source electrode of the MOS transistor N1 is connected with the power source 4, the voltage of the source electrode remains unchanged, for example, always at 12V. As a result, along with charge and discharge of the capacitor C1, the gate electrode of the MOS transistor N1 will have different voltages and thus different voltage differences exist between the source electrode and the gate electrode. When the voltage difference satisfies the conduction voltage drop of the MOS transistor N1, the source electrode and the gate electrode of the MOS transistor N1 will be turned on. As described above, the capacitor C1 controls the source electrode and the gate electrode of the MOS transistor N1 to be on or off by controlling the voltage applied on the gate electrode of the MOS transistor N1.

The control circuit 3 further includes a triode V1 232. A first end of the triode V1 is a base electrode, i.e., a control signal input end. A second end of the triode V1 is an emitter electrode which is grounded. A third end of the triode V1 is a collector electrode connected with the second end of the capacitor C1 and the gate electrode of the MOS transistor N1. When there is a voltage difference between the first end and the second end of the triode V1 and satisfies its conduction voltage threshold, the third end and the second end of the triode V1 will be turned on. Since the second end is grounded, the levels of the second end and the third end of the triode V1 will be pulled down after the conduction. Here, the voltage drop of the second end of the capacitor C1 is also pulled down slowly, that is, the capacitor C1 starts to discharge to complete discharge. When a voltage difference exists between the first end and the second end of the triode V1 and does not satisfy its conduction voltage drop, the third end and the second end of the triode V1 will be cut off. Since the third end is connected with the power source 4, the level of the third end of the triode V1 will be slowly pulled up after its cutoff. Here, the voltage drop of the second end of the capacitor C1 is also pulled up slowly, that is, the capacitor C1 starts to be charged to saturation.

The first end of the triode V1 receives a control signal PANEL_ON/OFF 235. The control signal is sent from a main chip. Illustratively, when PANEL_ON/OFF=1, it indicates that the display apparatus is powered-on or started, and the power source 4 supplies power to the load 2. When PANEL_ON/OFF=0, it indicates that the display apparatus is shut down and the power source 4 stops supplying power to the load 2.

The control circuit 3 further includes a resistor R1 236 and a resistor R2 238. The resistor R1 is connected in parallel with the capacitor C1. The resistor R1,resistor R2 and the triode V1 are connected in series.

Taking a display screen as a exemplary load, working states of different modules of the entire circuit after the display apparatus is started and shutdown will be discussed below.

Specifically, as shown in FIG. 2, the display apparatus starts the power source, the MOS transistor N1 is not turned on and the triode V1 is in a disconnected state. The power source 4 charges the capacitor C1 through the interface +12V_IN till saturation. As a result, the voltages across the capacitor C1 both reach 12V, and there is no voltage difference between the source electrode and the gate electrode of the MOS transistor N1, that is, the MOS transistor N1 satisfies a non-conductive condition. In one implementation, the MOS transistor N1 satisfying the non-conductive condition may refer to the MOS transistor N1 not satisfying a conductive or conduction condition. Thus, the MOS transistor N1 is in a disconnected state. Here, voltages at the points A, B, C and D in FIG. 2 are same, i.e. 12V.

When the control circuit 3 receives a control signal for supplying power to the load, that is, the triode V1 of the control circuit 3 receives a control signal PANEL_ON/OFF=1 generated by software, the triode V1 is turned on and the voltage of the first end of the resistor R2 connected to the triode V1 is quickly pulled down. Since the second end of the resistor R2 is connected with the capacitor C1 and the voltage across the capacitor is not abruptly changed, the voltages at the points A, B and D are not pulled down in time.

The capacitor C1 starts to discharge slowly through the resistor R2 so that the voltages at the points A, B and D are decreased slowly. When the capacitance of the capacitor C1 is discharged completely, that is, the discharge of the capacitor C1 is completed, the branch where the capacitor C1 is located is substantially equivalent to an open circuit and voltages at the points A, B and D are stable. Due to voltage division of the resistor R1 and the resistor R2, the voltages of the points A, B and D are 4V. That is, along with the discharge of the capacitor C1, the voltage of the gate electrode of the MOS transistor N1 is slowly decreased from 12V to 4V. Here, the voltage of the source electrode of the MOS transistor N1 is 12V.

It is assumed that the conductive/conduction condition of the MOS transistor N1 is that a voltage drop of 6V exists between the source electrode and the gate electrode, that is, the voltage drop $V_{gs}=V_g-V_s=-6V$, where $V_g$ refers to a voltage of the gate electrode of the MOS transistor N1 and $V_s$ refers to a voltage of the source electrode of the MOS transistor N1. Likewise, a non-conductive condition may refer to a condition that, for the MOS transistor N1, a voltage drop of 6V does not exist between the source electrode and the gate electrode. In other words, during a process of slow voltage reduction at the point B, when a voltage drop of 6V exists between the source electrode and the gate electrode of the MOS transistor N1, the source electrode and the drain electrode of the MOS transistor are turned on, so that the power of the power source sequentially passes through the interface +12V_IN, the MOS transistor N1 and the VCC-Panel interface to be supplied to the load.

Therefore, when the control circuit 3 receives the control signal PANEL_ON/OFF=1, the MOS transistor N1 in the power supply circuit 1 will not be immediately turned on but wait for discharge of the capacitor C1. In a case that the capacitor C1 discharges and the MOS transistor N1 reaches the conduction condition, the power source 4 supplies power to the load 2, thereby achieving the slow power-on effect of the load 2. During a period of time from receiving the control signal to turning on the MOS transistor N1 by the control circuit 3, the impulse current and the impulse voltage of the power source 4 will not be applied to the load 2, thereby protecting the load.

The above process includes a first time for the control circuit receiving the control signal for supplying power to the load and a second time for the control circuit controlling the MOS transistor N1 to turn on based on the control signal so as to actually supply power to the load. A time interval between the first time and the second time is prolonged through discharge of the capacitor. When the display apparatus is started, the conduction time of the MOS transistor N1 for supplying power to the load is delayed. Further, a power-on slope of the load of the display apparatus during a start process is adjusted.

Figure 3A:
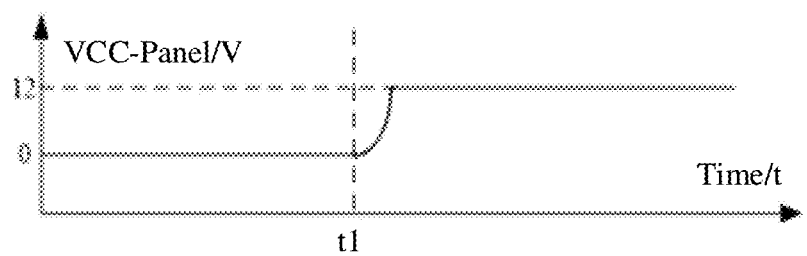
FIG. 3A is a sequence diagram illustrating a voltage of a load of a display apparatus according to some examples of the present disclosure.

FIG. 3A is a sequence diagram of a voltage of a load of a display apparatus according to some examples of the present disclosure. As shown in FIG. 3A, if the capacitor C1 is not in the control circuit of the display apparatus, the control circuit receives a control signal for supplying power to the load at the first time t1, so that a voltage drop exists in the first end and the second end of the triode V1 and the triode V1 is turned on to be grounded, that is, the third end of the triode V1 is pulled down to 0V quickly. Similarly, the voltages at the points A, B and D are also pulled down. Thus, the voltage of the gate electrode of the MOS transistor N1 is pulled down to 0V quickly. The source electrode and the drain electrode of the MOS transistor N1 is turned on at the first time point t1 due to the voltage difference between the gate electrode and the source electrode of the MOS transistor N1, and the voltage at the interface VCC-Panel is increased to 12V at the first time point t1.

Figure 3B:
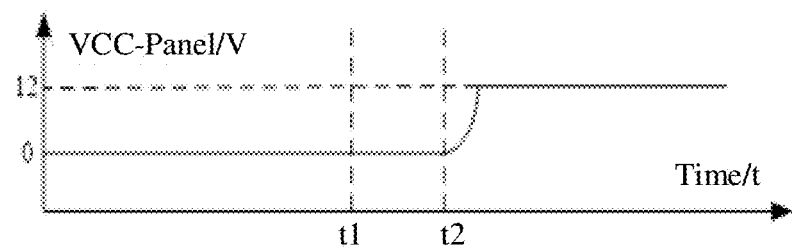
FIG. 3B is a sequence diagram illustrating a voltage of a load of a display apparatus according to some examples of the present disclosure.

In FIG. 3B, if the capacitor C1 is arranged in the control circuit of the display apparatus, when the control circuit receives the control signal for supplying power to the load at the first time point t1, the triode V1 is immediately turned on to be grounded and the third end of the triode V1 is quickly pulled down to 0V. However, because the voltage across the capacitor C1 is not abruptly changed, the voltages at the points A, B and D will not be quickly pulled down, that is, the voltage of the gate electrode of the MOS transistor N1 will not be pulled down quickly. The capacitor C1 pulls down the voltage of the gate electrode of the MOS transistor N1 at the second time point t2 of the discharge process of the capacitor, so that the voltage difference between the gate electrode and the source electrode of the MOS transistor N1 satisfies the conduction condition. Thus, the voltage at the interface VCC-Panel is increased to 12V at the second time point t2.

It can be seen from a comparison between the two voltage sequence diagrams of FIG. 3A and FIG. 3B that the display apparatus in FIG. 2 realizes the slow power-on of the display apparatus by a capacitor arranged in the control circuit during a discharge process upon the power-on of the display apparatus. In this way, the impulse voltage and impulse current output from the interface +12V_IN of the power source 4 are prevented from directly being applied on the load VCC-Panel through the power supply circuit at the instant of power-on, thereby preventing the load from damage.

In some examples, the MOS transistor N1 is turned on only when the capacitor C1 is completely discharged. In other examples, during a discharge process of the capacitor C1, the MOS transistor will be turned on as long as the voltage of the second end of the capacitor C1 drops to a particular extent and satisfies the conduction voltage of the MOS transistor N1. Of course, a particular MOS transistor may also be selected so that the capacitor C1 discharges completely to satisfy the conduction condition of the MOS transistor.

When the display apparatus starts to power the load 2 through the input interface VCC-Panel of the load 2, the discharge of the capacitor C1 is completed. The voltage of the first end that is on the capacitor C1 and connected with the interface +12V_IN of the power source 4 is 12V, and the voltage of the second end that is on the capacitor C1 and connected with the gate electrode of the MOS transistor N1 is 4V after voltage division of the resistor R1 and the resistor R2. The voltage difference between the source electrode and the gate electrode of the MOS transistor N1 is greater than the conduction voltage of the MOS transistor N1, so that the MOS transistor N1 is conducted and the power source continuously supplies power to the load 2 through the MOS transistor N1.

During a shutdown process of the display apparatus, the control circuit 3 receives a control signal for stopping supplying power to the load, that is, when the control circuit 3 receives a control signal PANEL_ON/OFF=0 generated by software, which is configured for disconnecting the power supply circuit 1, the triode V1 of the control circuit 3 is cut off. Since the voltage across the capacitor C1 in the control circuit 3 is not abruptly changed, even though the points A, B and D shown in FIG. 2 connected with the capacitor C1 are connected with the interface +12V_IN of the power source 4 through the resistor R1, the voltages at the points A, B and D will not suddenly jump from 4V to 12V. The interface +12V_IN of the power source 4 charges the capacitor C1 through the resistor R1. During the charge process of the capacitor C1, the voltages at the points A, B and D increase gradually, that is, the voltage of the gate electrode of the MOS transistor N1 increases gradually. Along with gradual increase of the voltage on the gate electrode of the MOS transistor N1, the voltage difference between the source electrode and the gate electrode of the MOS transistor N1 gradually decreases from 8V. When the conduction condition of the MOS transistor N1 is not satisfied (it is still assumed that the conduction condition of the MOS transistor N1 is a voltage drop of 6V between the source electrode and the gate electrode), the gate electrode of the MOS transistor N1 controls the source electrode and the drain electrode of the MOS transistor N1 to be cut off. As a result, the load 2 of the display apparatus is powered off.

In the above examples, after the control signal PANEL_ON/OFF=0 is received, the MOS transistor N1 will not be cut off immediately but wait for the charge of the capacitor C1. During the charge process of the capacitor C1, because the MOS transistor N1 does not satisfy the conduction condition, the power source disconnects power supply to the load, thereby realizing the slow power-off effect of the load.

The shutdown process of the display apparatus includes a third time for the control circuit receiving a control signal for stopping supplying power to the load and a fourth time for the control circuit controlling the MOS transistor N1 to cut off based on the control signal so as to actually stop supplying power to the load. A time interval between the third time and the fourth time is prolonged through charge of the capacitor. When the display apparatus is powered-off, the disconnection time of the MOS transistor N1 for stopping supplying power to the load is delayed.

Figure 4A:
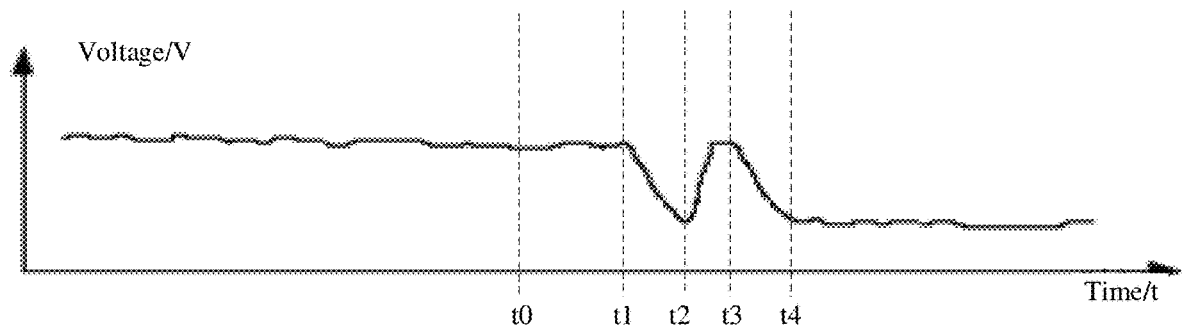
FIG. 4A is a schematic diagram illustrating a voltage change of a load of a display apparatus according to some examples of the present disclosure.

FIG. 4A is a schematic diagram illustrating a voltage change of a load of a display apparatus during a shutdown process of a display apparatus.

For the period of time t0-t1 shown in FIG. 4A, it is assumed that the control circuit of the display apparatus receives a control signal for controlling the power supply circuit to disconnect at a time point t0 during the shutdown process of the display apparatus. As shown in FIG. 2, the capacitor C1 of the control circuit starts to be charged, and the voltage of the gate electrode of the MOS transistor N1 starts to increase until the voltage of the load starts to power off at the time point t1.

Figure 4B:
FIG. 4B illustrates an example of a partial circuit of the circuit shown in FIG. 2.

FIG. 4B is an example of a partial circuit corresponding to the circuit of the display apparatus shown in FIG. 2. In FIG. 4B, the MOS transistor N1 is series-connected to the load of the display apparatus. The power source (12V) supplies power to the load through the MOS transistor N1. The MOS transistor N1 and the load both have resistances. When the load works, a voltage at the point H is a voltage drop divided for the load as follows:

$$V_H = 12 \times \frac{R_{load}}{R_{load} + R_{MOS}} \qquad \text{Equation (1)}$$

$V_H$ refers to a load voltage (at the point H), $R_{load}$ refers to a resistance of the load of the display apparatus, and $R_{MOS}$ refers to a voltage of the MOS transistor N1.

When the load of the display apparatus stops working, which is substantially equivalent to an open circuit, $R_{load}$ is infinite. Compared with a load working in normal state, the $V_H$ increases close to 12V. That is, when the load stops working, the MOS transistor is still turned on and the power source still supplies power to the load, resulting in rebound of the voltage of the load.

When the load of the display apparatus works normally, that is, when the display apparatus is in a heavy load state, the power source supplies a large current to the load through the power supply circuit. It means that an impedance of the load is very small and the divided voltage is also very small. When the load of the display apparatus stops working, that is, when the display apparatus is in a light load state, the power source supplies a small current to the load through the power supply circuit. It means that the impedance of the load is very large, which serves as a large resistor to undertake voltage division of the supply voltage supplied by the power source to the load.

For the period of time t1-t3 shown in FIG. 4A, even though the voltage of the load already starts to power off at the time point t1, the power supply circuit is disconnected at the time point t3 due to the capacitor C1 in the control circuit. That is, the power source still supplies power to the load during the period of time t1-t3, resulting in that the voltage of the load increases at the time point t2, namely, the voltage of the load rebounds.

For the period of time t3-t4 shown in FIG. 4A, along with continuous charge of the capacitor C1, the MOS transistor N1 in the power supply circuit is disconnected at the time point t3, the power source stops supplying power to the load and the voltage of the load drops again and finally drops to 0V at the time point t4, thereby powering off the load.

During the above shutdown process of the display apparatus, if the control circuit receives a control signal for controlling the power supply circuit to be disconnected at the time point t0, after the capacitor C1 in the control circuit is charged, the power disconnection of the load is not realized until the time point t4. Further, since the time of stopping supplying power to the load is later than the time of stopping working by the load between the time point t0 and the time point t4, the actual voltage of the load will rebound when the load is actually powered off, so that the voltage waveform of the load forms a "ditch" shown in FIG. 4. Therefore, during the shutdown process, in a case that apparatuses other than the display apparatus in an electronic device are powered off, if the power supply circuit is not disconnected, the load of the display apparatus will not be powered off in time, resulting in a voltage ditch in the load voltage of the display apparatus. In this case, since the load of the display apparatus is not powered off in time, a time sequence of display functions of the electronic device where the display apparatus is located is affected, leading to abnormal display of the display apparatus.

In the display apparatus of the present disclosure, a charging module is disposed in the control circuit, so that the capacitor is quickly charged through the charging module when the display apparatus is shut down, thereby quick shutdown of the display apparatus. In one implementation, the charging module may refer to a charging circuit. As a result, upon shutdown of the display apparatus, the voltage ditch of the load of the display apparatus resulting from slow power off caused by the capacitor in the control circuit of the display apparatus is eliminated. Further, the time sequence disorder resulting from the voltage ditch in the display apparatus is eliminated, thereby preventing abnormal displaying of the display apparatus.

Detailed descriptions will be made below in combination with the examples. Several examples below may be combined with each other, and those same or similar concepts or processes will not be repeated in some examples.

Figure 5:
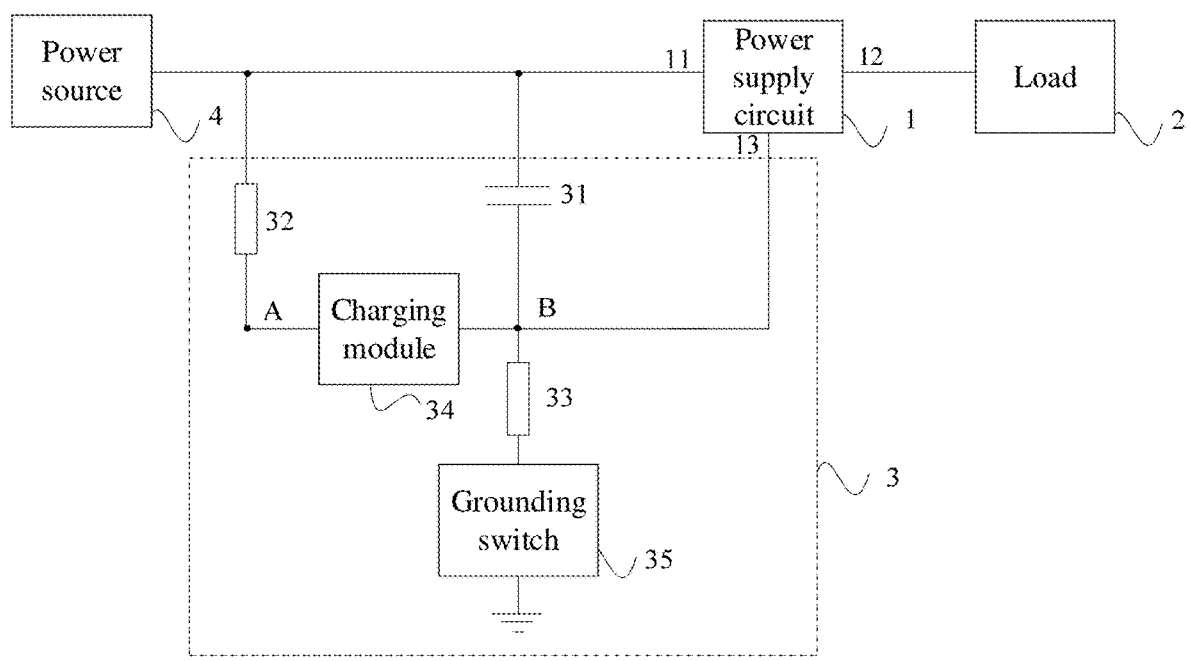
FIG. 5 is a schematic diagram illustrating a circuit of a display apparatus according to some examples of the present disclosure.

FIG. 5 is a schematic diagram illustrating a circuit of a display apparatus according to some examples of the present disclosure. In FIG. 5, the display apparatus according to some examples is based on the display apparatus shown in FIG. 1B. The control circuit 3 specifically includes: a capacitor 31, a first resistor 32, a second resistor 33, a charging module 34, and a grounding switch 35. A first end of the capacitor 31 and a first end of the first resistor 32 are connected to a power source 4 respectively. A second end of the first resistor 32 is connected to a first end of the charging module 34, and a second end of the charging module 34 is connected to a second end of the capacitor 31, a first end of the second resistor 33 and a third end 13 of the power supply circuit 1 respectively. A second end of the second resistor 33 is connected with a first end of the grounding switch 35 and a second end of the grounding switch 35 is grounded.

The power source 4 is configured to supply power to the load 2 through the power supply circuit 1. The control circuit 3 is configured to control the power supply circuit 1 to be turned on or cut off. The capacitor 31 is configured to discharge when the grounding switch 35 of the control circuit 3 is disconnected so as to slow down the control of the turn-on of the power supply circuit 1, and further configured to charge when the grounding switch 35 of the control circuit 3 is closed (the branch where the grounding switch 35 locates is conducted) so as to speed up control of the turn-off of the power supply circuit 1. A voltage between the first resistor 32 and the charging module 34 is configured to charge the capacitor 31. The second resistor 33 is configured to, when the grounding switch 35 is closed, discharge the capacitor 31 through the second resistor 33 and the grounding switch 35. The charging module 34 is configured to charge the capacitor 31 when the display apparatus is shut down. Further, during the charge process of the capacitor 31, the voltage of the second end of the capacitor 31 instructs the third end 13 of the power supply circuit 1 to control the first end 11 and the second end 12 of the power supply circuit to be disconnected, thereby powering off the load 2. For example, the power supply circuit includes an MOS transistor, the conduction condition of the MOS transistor is that a voltage is greater than or equal to the voltage difference (8V) between the source electrode and the gate electrode.

Descriptions are made to the charging process of the capacitor 31 when the display apparatus is shut down with reference to FIG. 5. In FIG. 5, the display apparatus is in a normal working state. The grounding switch 35 of the control circuit 3 is closed (the branch where the grounding switch 35 locates is conducted), a voltage at an end of the capacitor 31 where the capacitor 31 is connected with the power source is 12V, and a voltage at an end of the capacitor 31 where the capacitor 31 is connected with the power supply circuit is referred to as a first voltage. The first voltage is smaller than 12V after being divided by the first resistor 32 and the second resistor 33, and the voltage difference across the capacitor satisfies the conduction condition of the power supply circuit, so that the power supply circuit 1 is in a conduction state. As a result, the power source 4 supplies power to the load 2 through the power supply circuit 1.

When the display apparatus is shut down, after the control circuit 3 receives the control signal for stopping supplying power to the load, the grounding switch 35 in the control circuit 3 is immediately disconnected. Upon instant disconnection of the grounding switch 35, due to characteristics that the voltage across the capacitor 31 cannot be abruptly changed, the voltage at the second end (point B) of the capacitor 31 is smaller than the first voltage of 12V when maintaining the grounding switch 35 conducted. However, due to abrupt change of the voltages across the resistor, the voltage of the second end of the first resistor 32 connected to the power source 4 jumps into the voltage 12V of the power source 4. As a result, upon instant disconnection of the grounding switch 35, the voltage of the first end (point A) of the charging module 34 jumps to 12V and the voltage of the second end (point B) of the charging module remains at the first voltage smaller than 12V. Here, the charging module 34 maintains a voltage difference between the point A and the point B, so that the voltage of the point A jumps to 12V based on the voltage of the power source while the voltage of the point B is maintained at the first voltage smaller than 12V due to the characteristics of the capacitor 31.

Subsequently, due to the voltage difference between point A and point B upon instant disconnection of the grounding switch, the point A of the second end of the first resistor 32 charges the capacitor 31 through the charging module 34, so that the voltage of the point B increases, that is, the voltage of the second end of the capacitor 31 increases. When the increased voltage does not satisfy the conduction condition of the power supply circuit, the second end of the capacitor 31 controls the first end 11 and the second end 12 of the power supply circuit 1 to be disconnected through the connection to the third end 13 of the power supply circuit 1, thereby powering off the load 2.

In FIG. 5, the capacitor is charged by the charging module. In FIG. 2, the capacitor is charged by the power source through the resistor R1. It is assumed that the power source V charges the capacitor C through the resistor R, V1 is an initial voltage of the capacitor, and V2 is a voltage after the charge of the capacitor is completed. In this case, the voltage of the charging process of the capacitor is expressed by the following equation:

$$Vt = V1 + (V2 - V1) \times \left[1 - \exp\left(-\frac{t}{RC}\right)\right] \quad \text{Equation (2)}$$

Correspondingly, the charging time t of the capacitor is expressed by the following equation:

$$t = RC \times \ln\left[\frac{(V2 - V1)}{(V2 - Vt)}\right] \quad \text{Equation (3)}$$

Therefore, it can be known from the direct proportion t~RC of the charging equation of the capacitor that the larger, the resistance of the charging circuit is, the smaller the current for charging the capacitor is and the longer the time for charging the capacitor is; on the contrary, the smaller the resistance of the charging circuit is, the larger the current for charging the capacitor is and the shorter the time for charging the capacitor is.

Thus, in the circuit shown in FIG. 5, the capacitor is charged through the charging module without using the resistor R1, so that the charging speed of the capacitor is faster than that of the circuit shown in FIG. 2. In this way, when the display apparatus is shut down, the power supply circuit is disconnected quickly to quickly disconnect the load from the power supply. Thus, the time sequence problem resulting from the slow power-off discussed above is solved.

In the display apparatus of the examples, the capacitor realizes not only quick power-off of the display apparatus upon shutdown but also slow power-on of the display apparatus upon startup. Specifically, when the display apparatus is in a shutdown state, the grounding switch 35 of the control circuit is in a disconnected state, and the voltages across the capacitor 31 are 12V. When the display apparatus is started, after the control circuit 3 receives the control signal for supplying power to the load, the grounding switch 35 of the control circuit 3 is immediately closed (or conducted). Upon instant conduction of the grounding switch 35, due to no current in the circuit, the charging module 34 maintains a voltage difference between point A and point B.

The voltage at point A is maintained at 12V by the power source and the voltage at point B is maintained at 12V due to advantages of the capacitor. Thus, when a voltage ground at an end of the resistor 33 connected to the grounding switch is set to 0V, the capacitor 31 starts to discharge through the second resistor 33, so that the voltage at point B, i.e. the voltage of the second end of the capacitor 31 gradually decreases.

During the voltage decrease process of the second end of the capacitor 31, when the decreased voltage satisfies the conduction condition of the power supply circuit, the second end of the capacitor 31 controls the first end 11 and the second end 12 of the power supply circuit 1 to be conducted through the connection to the third end 13 of the power supply circuit 1. The power source supplies power to the load through the power supply circuit. In this way, the load 2 is slowly powered on through the discharge of the capacitor 31.

In the display apparatus shown in FIG. 2, the capacitor C1 of the control circuit is directly connected with the resistor R1. Due to the characteristics that the voltages across the capacitor C1 cannot be abruptly changed, the voltages at point D and point B between the resistor R1 and the capacitor C1 are 0V upon instant disconnection of the triode V1. The power source charges the capacitor C1 through the resistor R1. When the capacitor is charged through a circuit series-connected to the resistor and the capacitor, because the resistor in the series connection circuit limits the current of the charging circuit, the charging time of the capacitor is related to the resistance value of the resistor in the series connection circuit.

In the display apparatus shown in FIG. 5, since the charging module 34 is disposed between the first resistor 32 and the capacitor 31, a voltage difference is formed between point A and point B across the charging module 34 upon instant disconnection of the grounding switch. With this voltage difference, the voltage (i.e. the voltage 12V of point A) of the first end of the charging module 34 directly charges the capacitor connected with the second end of the charging module 34 through the charging module 34, without passing the voltage 12V of the power source through the first resistor 32. In this way, the influence of the first resistor 32 on the charging time of the capacitor is reduced, so that the resistance value of the charging circuit of the capacitor 31 is reduced by a resistance value of the first resistor 32. Thus, the capacitor 31 is charged with a larger current through the RC series circuit and the charting time is shorter. The charging speed of the power source for the capacitor 31 after the grounding switch is disconnected is increasing and the capacitor 31 is quickly charged during a shutdown process of the display apparatus.

When the charging time of the capacitor decreases, the voltage of the second side (point B) of the capacitor 31 does not satisfy the conduction condition of the power supply circuit so that the time of disconnecting the power supply circuit is earlier than the time of switching the heavy load state of the display apparatus to the light load state. The capacitor disposed for slow power on in the control circuit of the display apparatus is eliminated and the problem of the voltage ditch of the load of the display apparatus resulting from slow power off upon shutdown of the display apparatus is solved. Thus, the time sequence disorder resulting from the voltage ditch in the display apparatus and the abnormal displaying of the display apparatus are prevented. In this way, the load of the display apparatus is slowly powered on when the electronic device is started and quickly powered off when the electronic device is shut down at the same time, thereby ensuring normal operation of the display apparatus.

Figure 6:
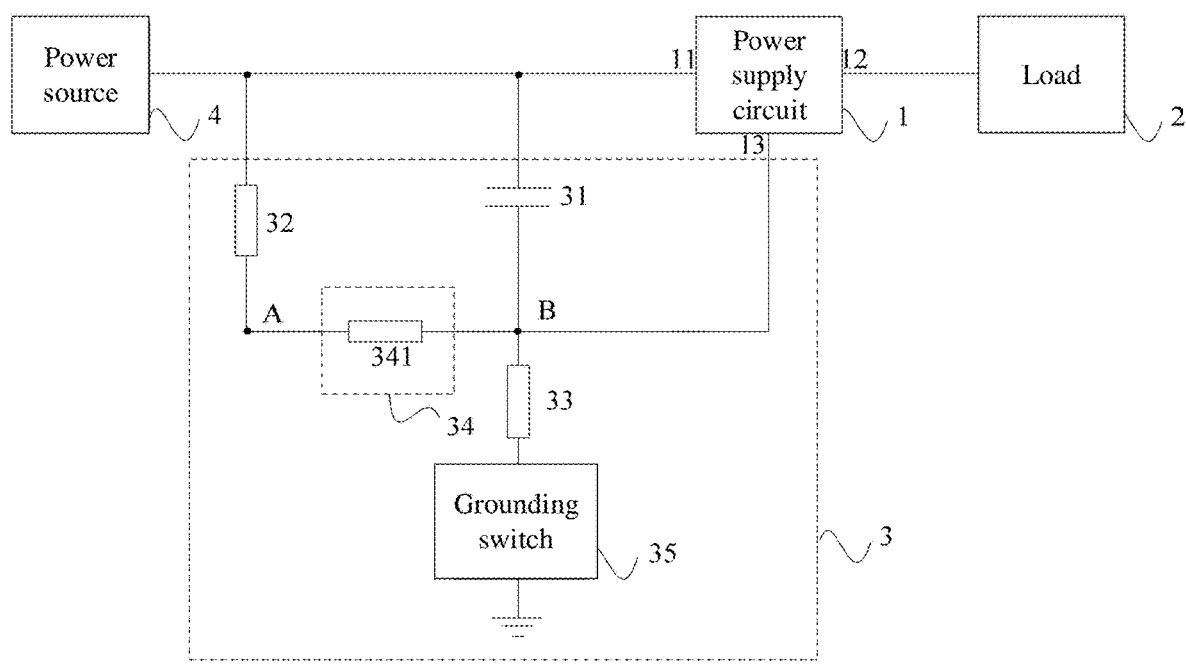
FIG. 6 is a schematic diagram illustrating a circuit of a display apparatus according to some examples of the present disclosure.

FIG. 6 is a schematic diagram illustrating a circuit of a display apparatus according to some examples of the present disclosure. Based on the example of FIG. 5, the charging module 34 includes a third resistor 341.

As shown in FIG. 6, a first end of the third resistor 341 is connected with the second end of the first resistor 32 and a second end of the third resistor 341 is connected with the second end of the capacitor 31 and the first end of the second resistor 33. The third resistor 341 maintains a voltage difference between point A and point B upon instant disconnection of the grounding switch when the voltage of point A is increased to 12V by the power source 4 and the voltage of point B is maintained at 0V due to properties of the capacitor 31. In this way, the voltages at points A and B will not be affected mutually upon instant disconnection of the grounding switch. After the grounding switch is disconnected, the voltage 12V of point A directly charges the capacitor 31 through the third resistor 341. According to the charging time calculation equation of the RC series circuit, the time of charging the capacitor 31 by the voltage 12V of point A is substantially in direct proportion to the resistance value of the third resistor 341. To ensure the voltage of the second end of the first resistor, i.e. the voltage of point A, more quickly charges the capacitor 31 through the third resistor 341, the resistance value of the third resistor 341 according to the examples of the present disclosure should be set to a small resistance value as possible, where the resistance value is approximate to 0; or the resistance value of the third resistor 341 is at least less than the resistance value of the first resistor 32.

Compared with the fact that the voltage of the power source charges the capacitor C through the first resistor 32 shown in FIG. 2, the voltage 12V of point A charges the capacitor C1 through the smaller third resistor 341, so that the resistance value of the charging circuit of the capacitor 31 is reduced, the current for charging the capacitor 31 is increased and the charging time is shorter. Further, the voltage of the second end of the capacitor 31, i.e. the voltage of point B, is increased quickly, thereby controlling the power supply circuit to be disconnected as quickly as possible.

In the display apparatus shown in FIG. 6, the third resistor 341 is disposed between the first resistor 32 and the capacitor 31 to generate a voltage difference between the second end (point A) of the first resistor 32 and the second end (point B) of the capacitor 31. Upon instant disconnection of the grounding switch 35, the voltage of point A charges the capacitor through the third resistor 341. In this way, the voltage 12V of the power source charges the capacitor 31 without the first resistor 32. Based on the charging time calculation manner of the capacitor in the RC series circuit, the influence of the first resistor 32 on the capacitor charging time is reduced in the RC circuit, so that the resistance value of the charging circuit of the capacitor 31 is reduced by the resistance value of the first resistor 32. Thus, the current for charging the capacitor 31 through the RC series circuit is larger and the charging time is shorter. The charging speed of the power source for the capacitor 31 after the grounding switch is disconnected is increased and the capacitor 31 is quickly charged during the shutdown process of the display apparatus.

In the above examples, the charging module formed with the third resistor 341 is simple in structure which is helpful to the promotion and realization of the technical applications.

Figure 7:
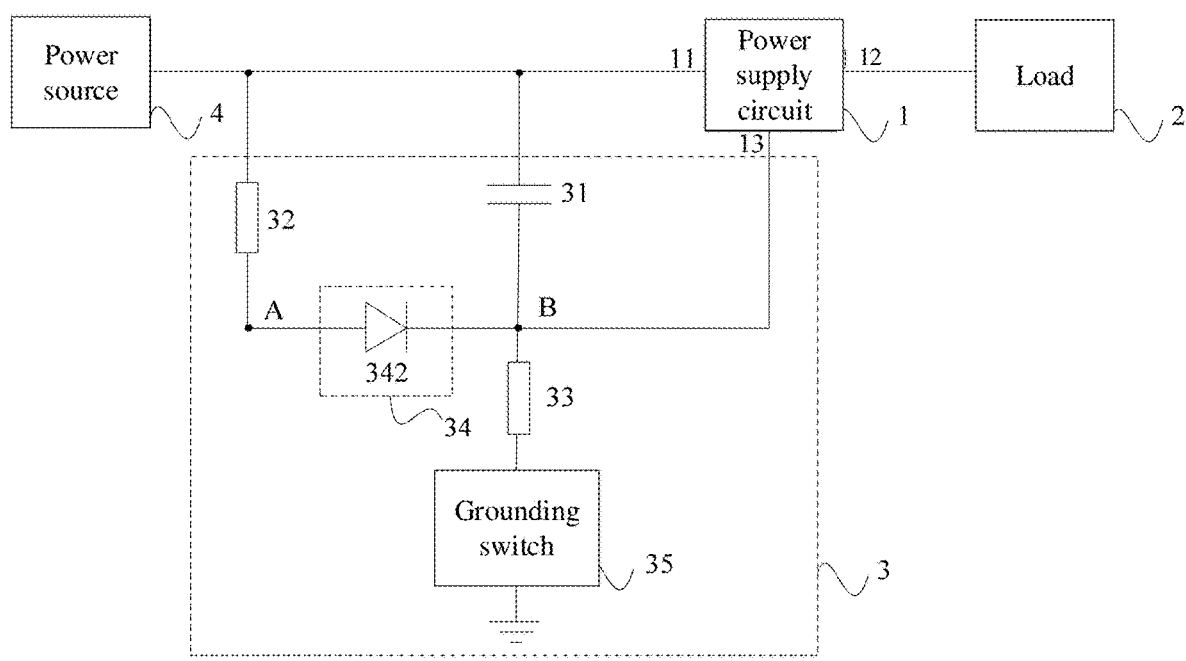
FIG. 7 is a schematic diagram illustrating a circuit of a display apparatus according to some examples of the present disclosure.

FIG. 7 is a schematic diagram illustrating a circuit of a display apparatus according to some examples of the present disclosure. Based on FIG. 5, the charging module 34 includes a diode 342. As shown in FIG. 7, an anode (also referred to as a positive pole) of the diode 342 is connected with the second end of the first resistor 32, and a cathode (also referred to as a negative pole) of the diode 342 is connected with the second end of the capacitor 31 and the first end of the second resistor 33 respectively. When the grounding switch is disconnected, the voltage of point A is increased by the power source to 12V and the voltage of point B is maintained at 0V due to characteristics of the capacitor 31. The diode 342 is configured to maintain the voltage difference between point A and point B, so that the voltages of the points A and B will not be affected mutually upon instant disconnection of the grounding switch. Further, after the grounding switch is disconnected, the voltage 12V of point A charges the capacitor 31 through the diode 342. Since a resistance is close to zero when the diode 342 is conducted forwardly, that is, the resistance of the charging circuit where the capacitor locates is very small, the charging speed of the capacitor is very fast, so that the voltage of point B of the second end of the capacitor 31 is increased quickly.

In addition to realizing the quick power-off of the display apparatus upon shutdown, the control circuit including the diode 342 realizes slow power-on of the display apparatus upon startup. Specifically, when the display apparatus is in a shutdown state, the grounding switch 35 of the control circuit is in a disconnected state and the voltages across the capacitor 31 are 12V. When the display apparatus is started, after the control circuit 3 receives the control signal for supplying power to the load, the grounding switch 35 of the control circuit 3 is immediately closed. Upon instant conduction of the grounding switch 35, due to no current in the circuit, the diode 342 maintains a voltage difference between point A and point B. The voltage at point A is maintained at 12V by the power source and the voltage at point B is maintained at 12V due to the characteristic that the voltage across the capacitor cannot be abruptly changed. Thus, when a voltage at an end of the second resistor 33 connected with the grounding switch quickly grounded and set to 0V, the capacitor 31 starts to discharge through the second resistor 33, so that the voltage at point B, i.e. the voltage of the second end of the capacitor 31, gradually decreases. When the decreased voltage at point B satisfies the conduction condition of the power supply circuit, the second end of the capacitor 31 controls the first end 11 and the second end 12 of the power supply circuit 1 to be conducted through the connection with the third end 13 of the power supply circuit 1. The power source supplies power to the load through the power supply circuit. In this way, the load 2 is slowly powered on through the discharge of the capacitor 31.

In the display apparatus shown in FIG. 7, because the second diode 342 is disposed between the first resistor 32 and the capacitor 31, a voltage difference is formed between points A and B across the diode 342 upon instant disconnection of the grounding switch. Further, an anode voltage of the diode 342 is greater than a cathode voltage. Therefore, due to conduction characteristics of the diode 342, this voltage difference enables the anode voltage of the diode 342, i.e. the 12V voltage of point A, to charge the capacitor connected to the cathode of the diode 342 through the diode 342. Thus, the 12V voltage of the power source charges the capacitor 31 without the first resistor 32. The charging speed of the power source for the capacitor 31 after the grounding switch is disconnected is increased, and the capacitor 31 is quickly charged through the diode 342 during the shutdown process of the display apparatus.

Figure 8:
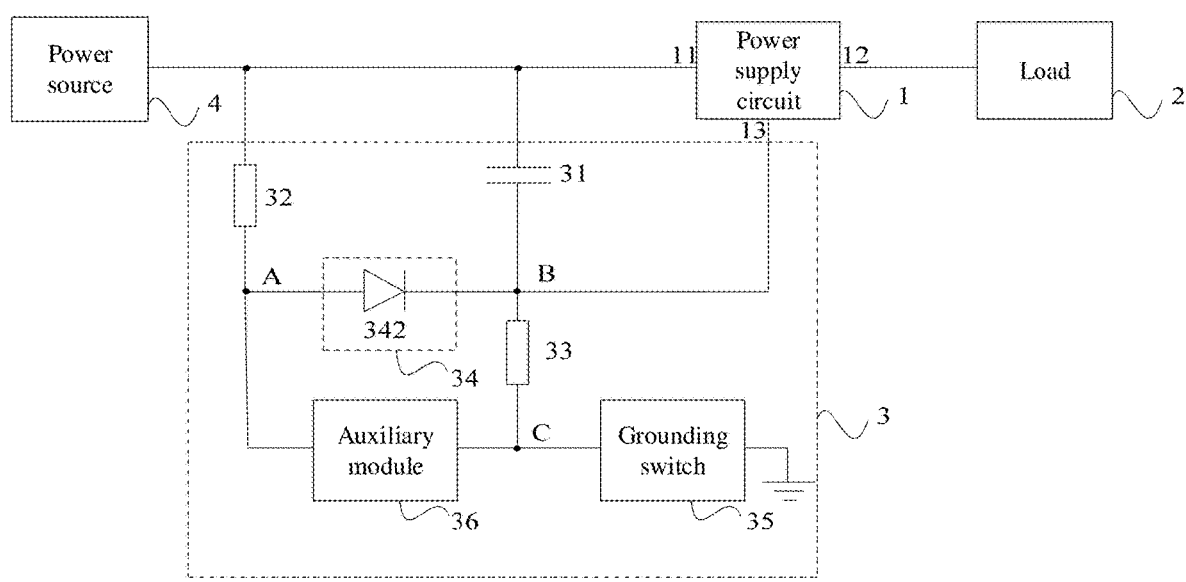
FIG. 8 is a schematic diagram illustrating a circuit of a display apparatus according to some examples of the present disclosure.

FIG. 8 is a schematic diagram illustrating a circuit of a display apparatus according to some examples of the present disclosure. Based on FIG. 7, an auxiliary module 36 is disposed to further increase the charging speed of the capacitor 31 and reduce the discharging speed of the capacitor 31. In one implementation, the auxiliary module may refer to an auxiliary circuit.

Specifically, a first end of the auxiliary module 36 is connected with the second end of the first resistor 32 and the anode of the diode 342 respectively. A second end of the auxiliary module 36 is connected with the second end of the second resistor 33 and the first end of the grounding switch 35 respectively. The functions of the auxiliary module 36 of FIG. 8 will be described below in combination with the quick charging process of the capacitor 31 when the display apparatus is shut down and the slow discharge process of the capacitor 31 when the display apparatus is started.

1. The display apparatus is shut down:

When the display apparatus shown in FIG. 8 is in a normal working state, the grounding switch 35 of the control circuit is in a conduction state, the voltage at an end of the capacitor 31 connected with the power source is 12V and the voltage at an end of the capacitor 31 connected with the power supply circuit is a second voltage. The second voltage is smaller than 12V after being divided by the first resistor 32 and the second resistor 33, the voltages at points A, B and C are the second voltage, and the voltage difference between both sides of the capacitor satisfies the conduction condition of the power supply circuit, so that the power supply circuit 1 is in a conduction state. As a result, the power source 4 supplies power to the load 2 through the power supply circuit 1.

When the display apparatus is shut down, after the control circuit 3 receives the control signal for stopping supplying power to the load, the grounding switch 35 in the control circuit 3 is immediately disconnected. Upon instant disconnection of the grounding switch 35, due to the characteristic that the voltage across the capacitor 31 cannot be abruptly changed, the voltage at the second end (point B) of the capacitor 31 is smaller than the first voltage of 12V when maintaining the grounding switch 35 conducted. However, due to abrupt change of the voltages across the resistor, the voltage of the second end of the first resistor 32 connected with the power source 4 jumps to the voltage 12V of the power source 4. The auxiliary module 36 is configured to connect the anode (point A) of the diode 342 with the second send (point C) of the second resistor 33. Since the grounding switch is cut off and the voltage at the point A is set to 12V by the power source, the auxiliary module 36 also sets the voltage of the point C to 12V.

As a result, upon instant disconnection of the grounding switch 35, the voltage of the first end (point A) of the charging module 34 jumps to 12V, the voltage of the second end (point C) of the second resistor 33 jumps to 12V as well, and the voltage of the anode (point B) of the diode 342 still remains at the second voltage smaller than 12V. At this moment, the diode 342 maintains a voltage difference between point A and point B, so that the voltage of point A jumps to 12V based on the voltage of the power source and the voltage of point B is maintained at the second voltage smaller than 12V due to the characteristic of the capacitor 31 at the same time. The second resistor 33 also maintains a voltage difference between point C and point B so that the voltage of the point C jumps to 12V based on the auxiliary module 36 and the voltage of point B is maintained at the second voltage smaller than 12V due to the characteristic of the capacitor 31 at the same time.

Subsequently, due to the voltage difference between point A and point B upon instant disconnection of the grounding switch, the point A of the second end of the first resistor 32 charges the capacitor 31 through the diode 342. Due to the voltage difference between points C and B upon instant disconnection of the grounding switch, the capacitor 31 may also be charged through the second resistor 33 at the same time. That is, the capacitor 31 may be charged through two branches of "point A, diode, and point B" and "point A, auxiliary module, the second resistor and the point B". In this way, the charging speed of the capacitor 31 is further increased.

2. The display apparatus is started.

Before the display apparatus shown in FIG. 8 is started, the load 2 of the display apparatus is in a disconnected state, the power supply circuit 1 is in a disconnected state, the grounding switch 35 of the control circuit 3 is in a disconnected state as well, and the voltages across the capacitor 31 are 12V and the voltages at the points A, B and C are 12V. As a result, the power source 4 does not supply power to the load 2 through the power supply circuit 1. When the display apparatus is started, after the control circuit 3 receives the control signal for supplying power to the load 2, the grounding switch 35 of the control circuit 3 is immediately closed to be grounded. Upon the instant conduction of the grounding switch 35, the voltage of the point C is quickly pulled down to 0V. As a result, the auxiliary module also sets the voltage of the point A to 0V due to connection to the anode (point A) of the diode 342 and the second end (point C) of the second resistor 33. Because the voltages across the capacitor 31 is not abruptly changed, the voltage of point B is maintained at 12V and the anode voltage of the diode 342 is greater than the cathode voltage. Since the diode 342 is cut off due to reverse cutoff characteristics, the diode 342 maintains the voltage difference between the points A and B. As a result, the capacitor 31 is not grounded through the diode 342 and the auxiliary module but discharges sequentially through the second resistor 33 and the grounding switch 35. The capacitor 31 discharges through the second resistor 33 so that the voltage of the first end (point B) of the second resistor 33 slowly decreases from 12V. When the decreased voltage satisfies the conduction condition of the power supply circuit, the first end 11 and the second end 12 of the power supply circuit 1 are controlled to be conducted through the third end 13 of the power supply circuit 1.

Figure 9:
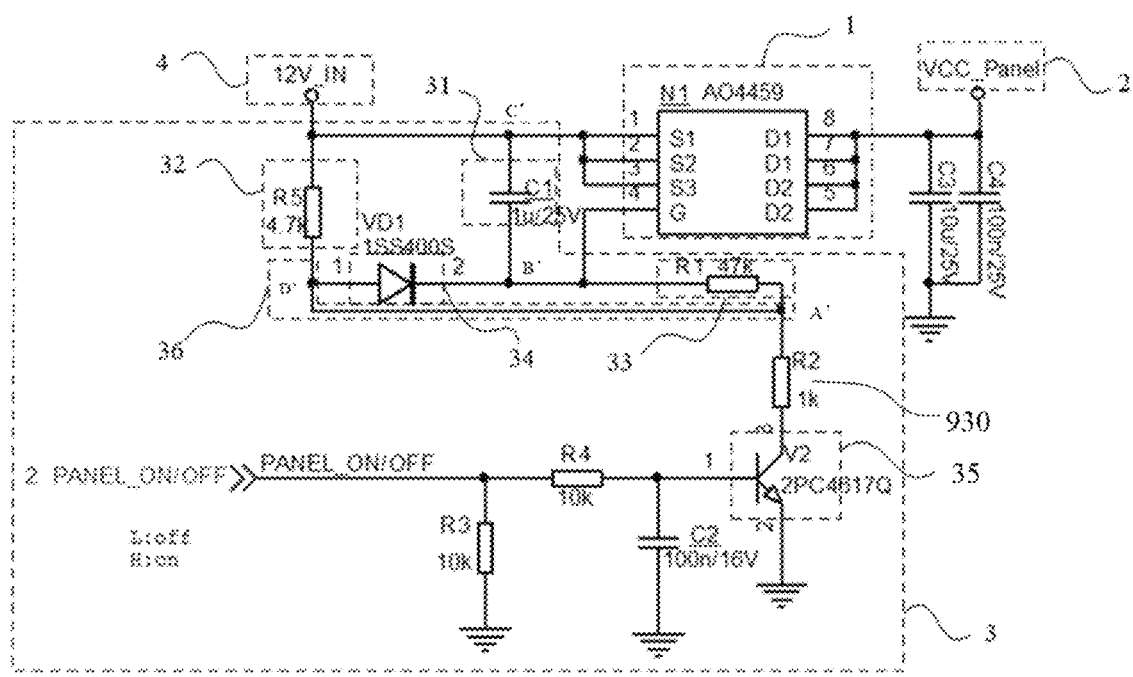
FIG. 9 is a schematic diagram illustrating a circuit of a display apparatus according to some examples of the present disclosure.

In an example, in the above example shown in FIG. 8, the auxiliary module 36 specifically includes a connection circuit which is in the form of a segment of wire configured for connecting the second end of the first resistor 32 with the second end of the second resistor 33, which will be further described in FIG. 9.

In the display apparatus shown in FIG. 8, the charging module 34 includes the diode 342 and the auxiliary module 36. Due to the voltage difference between point A and point B upon instant disconnection of the grounding switch 35, the point A of the second end of the first resistor 32 charges the capacitor 31 through the diode 342. Due to the voltage difference between the points C and B upon instant disconnection of the grounding switch, the capacitor 31 may also be charged through the second resistor 33 at the same time. When the grounding switch is closed (conducted), the capacitor discharges only through the second resistor due to reverse cutoff characteristics of the diode and the auxiliary module 36. Thus, the voltage ditch of the load in the display apparatus may be eliminated in the examples of the present disclosure to realize slow power-on upon start of the display apparatus. At the same time, due to the auxiliary module, the quick power-off upon shutdown is realized. In this way, normal operation of the display apparatus is guaranteed.

FIG. 9 is a schematic diagram illustrating a circuit of a display apparatus according to some examples of the present disclosure. Based on the example of FIG. 8, the example provides a specific circuit implementation.

Referring to FIG. 9, +12V_IN in the figure is an interface of the power source 4 of the display apparatus and the voltage of the power source 4 is 12V. VCC-Panel is an input interface of the load 2 of the display apparatus. The load is powered by the VCC-Panel interface. Specifically, the power supply circuit 1 is the MOS transistor N1. The control circuit 3 includes a capacitor C1 31, a first resistor R5 32, a diode VD1 34, a second resistor R1 33 and a fourth resistor R2 930. A first end of the first resistor R5 is connected with the interface 12V_IN of the power source, a second end of the first resistor R5 is connected with a anode of the diode VD1 and a first end of the third resistor R2, a cathode of the diode VD1 is connected with the second end of the capacitor C1 and the first end of the second resistor R1. A first end of the fourth resistor R2 is connected with the second end of the first resistor R5, the anode of the diode VD1 and the second end of the second resistor R1 respectively, and the second end of the fourth resistor R2 is grounded through the triode V2.

In an example, the power supply circuit 1 shown in FIG. 9 is a large-current MOS transistor. The source electrode of the MOS transistor N1 is connected with the power source, the first end of the first resistor R5 and the first end of the capacitor C1 respectively. The gate electrode of the MOS transistor N1 is connected with the second end of the capacitor C1, the cathode of the diode VD1 and the first end of the second resistor R1 respectively and the drain electrode of the MOS transistor N1 is connected with the load 2.

In an example, the control circuit 3 shown in FIG. 9 further includes a switching circuit 35 configured to control the grounding switch to be on or off based on the control signal. The switching circuit 35 includes a triode V2. In some implementations, the switching circuit 35 may control a grounding switch in FIGS. 5-8. A first end of the triode V2 is configured to receive a control signal PANEL_ON/OFF. A third end of the triode V2 is connected with the second end of the fourth resistor R2, and a second end of the triode V2 is grounded. The control signal PANEL_ON/OFF is specifically configured to control the second end and the third end of the triode V2 to be on or off through the first end of the triode V2. In an example, the control signal PANEL_ON/OFF includes a power switching signal of the display apparatus, which is configured to indicate for providing power supply to the load or stop power supply for the load.

Figure 10:
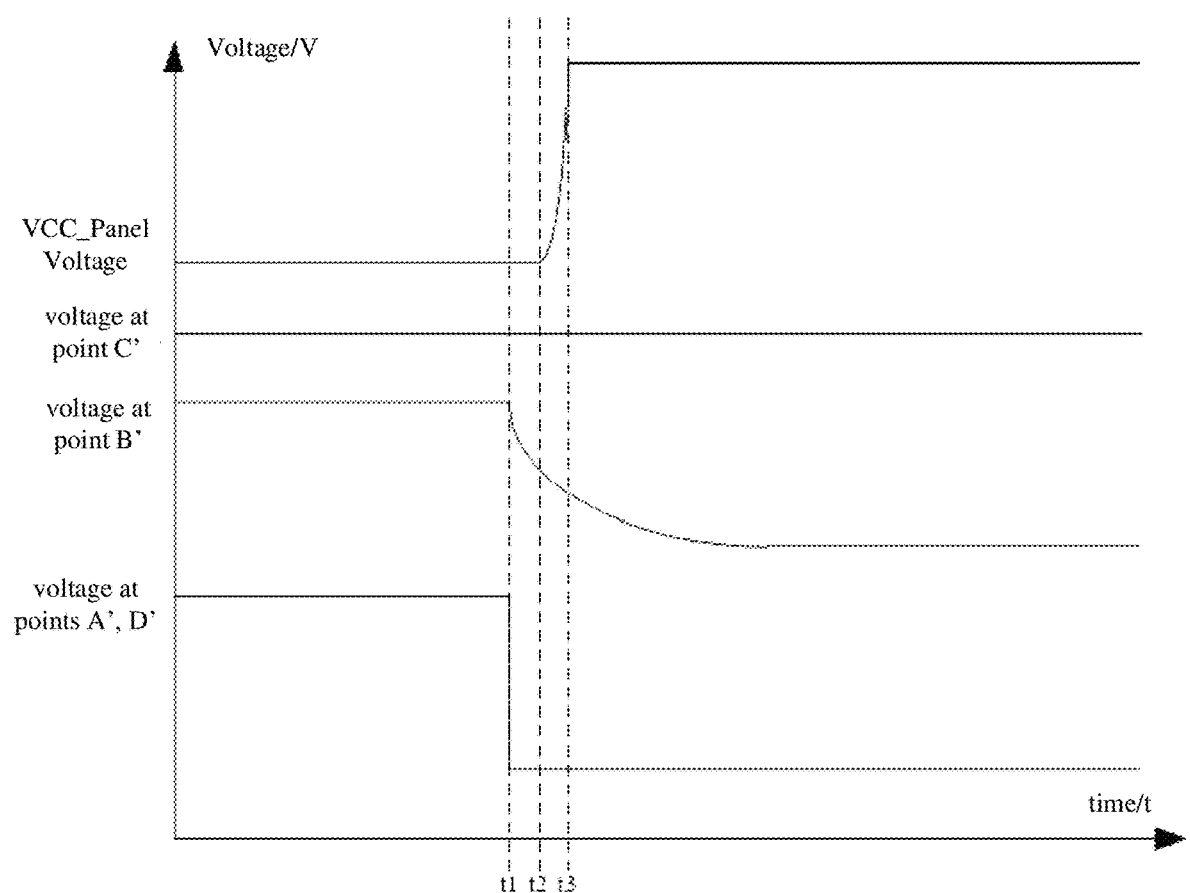
FIG. 10 is a schematic diagram illustrating a circuit voltage waveform when a display apparatus is started according to some examples of the present disclosure.

With reference to FIGS. 9 and 10, descriptions are made to the charge or discharge of the capacitor, which is performed by controlling the diode V2 when the control circuit of the display apparatus receives the power switching signal of the display apparatus during the start and shutdown processes of the display apparatus.

1. Before the display apparatus is started, the power source 12V_IN=0 in a case that the 12V_IN of the power source of the display apparatus is not powered on. The software by which the display apparatus controls the MOS transistor N1 to be on or off does not participate in the control of generation of the control signal PANEL_ON/OFF. Thus, PANEL_ON/OFF is in a high impedance state. Due to the pull-down resistor R3, the base electrode (first end) of the triode V2 is at a low level and the triode V2 is in a cutoff state. In this case, the MOS transistor N1 is in a disconnected state and the load 2 of the display apparatus is also in a disconnected state.

2. Before the display apparatus is started, if the power source of the display apparatus supplies power, the voltage of the interface 12V_IN is 12V. Here, the voltages at the points A', B', C' and D' in FIG. 9 are equal, that is, V(A')=V(B')=V(C')=V(D')=12V. As a result, the voltages of the gate electrode and the source electrode of the MOS transistor N1 do not satisfy the conduction condition, and the MOS transistor N1 is in a disconnected state.

3. As shown in FIG. 9, after the display apparatus is started, the software by which the display apparatus controls the MOS transistor N1 to be on or off generates the control signal PANEL_ON/OFF=1 for connecting with the MOS transistor N1. Thus, the triode V2 is turned on. Because the voltages across the capacitor C1 is not abruptly changed, the capacitor C1 maintains the voltage of the point B'. Further, due to reverse cutoff characteristics of the diode VD1, the capacitor C1 discharges only through the R1 and R2, where the current path is the capacitor C1, the resistor R1, the resistor R2 and the triode V2. Because the points A' and D' are not directly connected to the capacitor C1, when the voltage of the point B' gradually decreases, the voltages Vgs=−8V of the gate electrode and the source electrode of the MOS transistor N1 satisfy the conduction condition of the MOS transistor N1, and the source electrode and the drain electrode of the MOS transistor are conducted. Subsequently, the +12V_IN of the power source starts to supply power to the VCC_Panel through the MOS transistor N1 so that VCC-Panel=12V. Thus, a time interval from the time for the control circuit receiving the control signal to the time for conduction of the MOS transistor is prolonged due to discharge of the capacitor, thereby delaying the conduction time of the MOS transistor N1 and adjusting the power-on slope of the VCC-Panel voltage. After the discharge of the capacitor C1 is completed, V(A')=V(D')=12V*R2/(R2+R5)= 2.42V. The voltage difference between the gate electrode and the source electrode of the MOS transistor reaches Vgs=−9.58V, satisfying the conduction condition of the MOS transistor N1 and maintaining the source electrode and the drain electrode of the MOS transistor N1 conducted.

FIG. 10 is a schematic diagram illustrating a circuit voltage waveform when a display apparatus is started according to some examples of the present disclosure. It is assumed that the display apparatus is in a shutdown state before the time point t1, and the power source of the display apparatus in a powering state. In this case, the voltage of the point C' is maintained at 12V, the voltages at the points A', B' and D' are all 12V and the VCC_Panel voltage for supplying power to the load is 0V. At the time point t1, after the control circuit receives the control signal for controlling the MOS transistor N1 to be turned on, the diode V2 is turned on. The voltages of the points A' and D' are quickly grounded due to the conduction of the diode V2 and decreased to 0V at the time point t1. Due to existence of the capacitor C1, the voltage at the point B' is not abruptly changed, but decreased by gradually discharging the capacitor C1 through the resistor R2 and the diode V2. At the time point t2, the decreased voltage of the point B' enables the voltages of the gate electrode and the source electrode of the MOS transistor N1 to satisfy the conduction condition of the MOS transistor N1 and thus the source electrode and the drain electrode of the MOS transistor N1 are conducted. The 12V_IN of the power source supplies power to the load through the MOS transistor N1, so that the voltage of the load, i.e. the voltage of VCC_Panel, gradually increases and increases to 12V at the time point t3.

4. When the display apparatus is shut down, the software by which the display apparatus controls the MOS transistor N1 to be on or off generates the control signal PANEL_ON/ OFF=0 for disconnecting the MOS transistor N1. Thus, the triode V2 is cut off. The power source 12V_IN charges the capacitor C1 through two branches. A current path of a first branch is the power source interface 12V_IN, the resistor R5 and the diode VD1, and a current path of a second branch is the power source interface 12V_IN, the resistor R5 and the resistor R1. Because the points A' and D' are not directly connected with the capacitor C1, the voltages of the points A' and D' quickly become V(A')=V(D')=12V after the V2 is disconnected. The voltages across the capacitor C1 cannot be changed suddenly due to its characteristics. Thus, the voltage of the point B' remains at the voltage (for example, 2.42V) after discharge is completed during the start process because of not being abruptly changed. The capacitor C1 is quickly charged to 12V through two charging branches of the point A' and the point D' in FIG. 9. In a first charging branch, because the capacitor is directly charged through the diode VD1 from the point D' rather than through the resistor R5, the resistance of the RC series circuit is reduced and the charging current of the capacitor is increased so that the charging time of the capacitor is shortened. The voltage of the point B' quickly increases. The increased voltage of the point B' enables the voltages of the gate electrode and the source electrode of the MOS transistor N1 not to satisfy the conduction condition of the MOS transistor N1, and thus the source electrode and the drain electrode of the MOS transistor are disconnected.

In the above process, before the voltage of the load rebounds, the voltage of the load, i.e. the voltage of VCC_Panel, is quickly decreased to a voltage value which does not meet the conduction condition of the MOS transistor N1, thereby preventing occurrence of the voltage ditch of the load resulting from slow power-off when the display apparatus is shut down. In this way, the time sequence disorder and abnormal displaying of the display apparatus arising from the voltage ditch are prevented.

Figure 11:
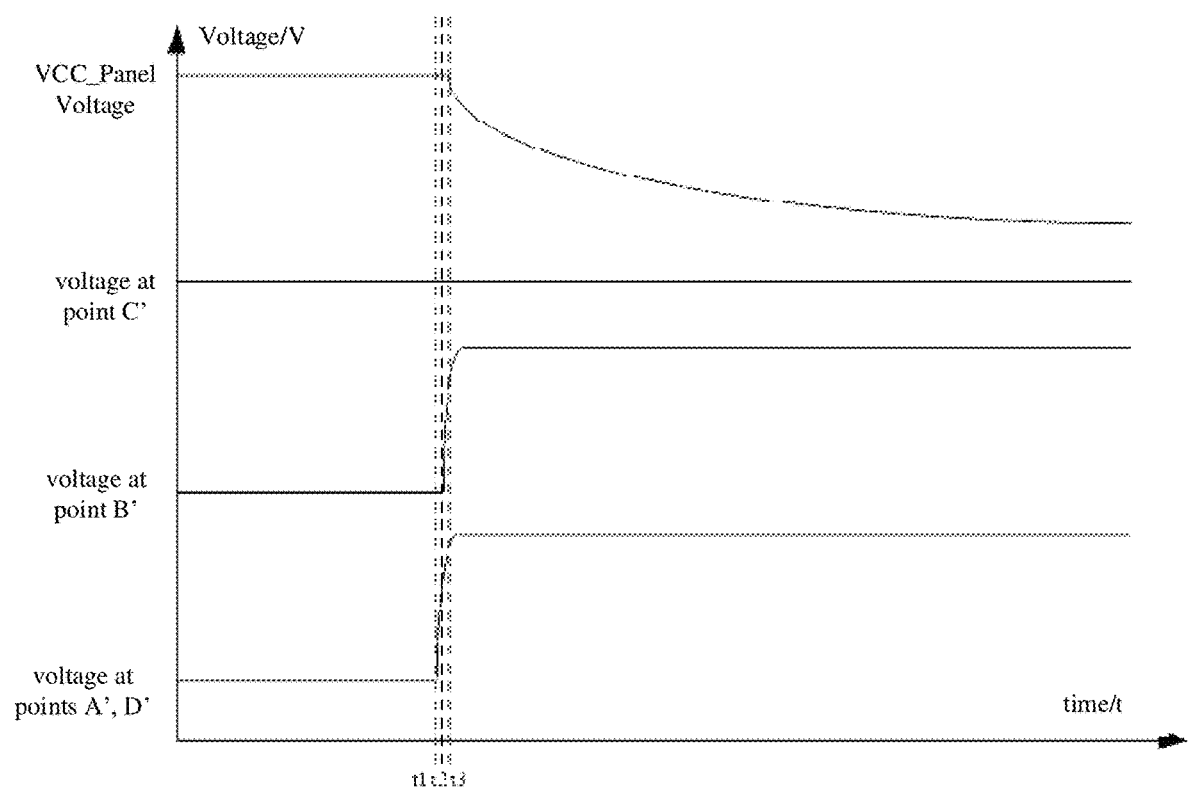
FIG. 11 is a schematic diagram illustrating a circuit voltage waveform when a display apparatus is shut down according to some examples of the present disclosure.

FIG. 11 is a schematic diagram illustrating a circuit voltage waveform when a display apparatus is shut down according to some examples of the present disclosure. Before the time point t1, the display apparatus is in a normal working state, and the VCC_Panel voltage supplying power to the load is 12V, the voltage of the point C' is always at 12V due to connection to the power source and the voltages at the points A', B' and D' all remain at third voltages. At the time point t1, after the control circuit receives the control signal for controlling the MOS transistor N1 to be disconnected, the diode V2 is disconnected, and the voltages at the points A' and D' are quickly increased to 12V due to disconnection of the diode V2. Due to the capacitor, the voltage at the point B' is not abruptly changed but supplies power through the two branches of the points D' and A', resulting in increased voltage of the point B'. At the time point t2, the increased voltage of the point B' enables the voltage difference of the gate electrode and the source electrode of the MOS transistor N1 not to satisfy the conduction condition, and thus the source electrode and the drain electrode of the MOS transistor N1 are disconnected. From the time point t2 on, the voltage of the load (VCC_Panel voltage) gradually decreases and decreases to 0V at the time point t3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display apparatus, comprising:
a load;
a power source configured to supply electric power to the load;
a power supply circuit connecting with the power source and the load and configured to turn on or off an electric path between the power source and the load; and
a control circuit connecting with the power source and the power supply circuit, the control circuit comprising a capacitor, a first resistor, a second resistor, a charging circuit, and a grounding switch, wherein:
a first end of the capacitor and a first end of the first resistor are connected with the power source,
a second end of the first resistor is connected with a first end of the charging circuit,
a second end of the charging circuit is connected with a second end of the capacitor, a first end of the second resistor and the power supply circuit,
a second end of the second resistor is connected with a first end of the grounding switch,
a second end of the grounding switch is grounded,
the control circuit is configured to control the power supply circuit to determine whether the power source supplies power to the load,
the charging circuit is configured to maintain a voltage difference between the second end of the first resistor and the second end of the capacitor when the grounding switch cuts off, so that the capacitor is charged from the second end of the first resistor through the charging circuit,
the capacitor is configured to control the power supply circuit to be disconnected when a voltage of the second end of the capacitor satisfies a non-conductive condition for the power supply circuit,
the charging circuit comprises a diode,
an anode of the diode is connected with the second end of the first resistor, and
a cathode of the diode is connected with the second end of the capacitor, the first end of the second resistor and the power supply circuit respectively,
the display apparatus further comprising an auxiliary circuit, wherein:
a first end of the auxiliary circuit is connected with the second end of the first resistor and the anode of the diode respectively, and a second end of the auxiliary circuit is connected with the second end of the second resistor and the first end of the grounding switch respectively, and
the auxiliary circuit is configured to form a voltage difference between the anode and the cathode of the diode when the grounding switch is conducted, so that the capacitor discharges through the second resistor and the grounding switch, and is further configured to control the power supply circuit to be turned on when the voltage of the second end of the capacitor satisfies a conductive condition of the power supply circuit during the discharge of the capacitor.

2. The display apparatus according to claim 1, wherein:
the auxiliary circuit comprises a connection circuit; and
the connection circuit is configured to connect the second end of the first resistor and the second end of the second resistor.

3. The display apparatus according to claim 1, further comprising:
a switching circuit, configured to control the grounding switch to be on or off based on a control signal.

4. The display apparatus according to claim 3, wherein:
the switching circuit comprises a triode and a fourth resistor;
a first end of the triode is configured to receive the control signal, a third end of the triode is connected with a second end of the fourth resistor, and a second end of the triode is grounded; and
the control signal is configured to control the second end and the third end of the triode to be on or off through the first end of the triode.

5. The display apparatus according to claim 4, wherein:
the control signal comprises an electric signal for indicating whether the power source provides power to the load.

6. The display apparatus according to claim 1, wherein:
the power supply circuit comprises a large-current metal oxide semiconductor field effect (MOS) transistor;
a source electrode of the MOS transistor is connected with the power source, the first end of the first resistor and the first end of the capacitor respectively;
a gate electrode of the MOS transistor is connected with the second end of the capacitor, the cathode of the diode and the first end of the second resistor; and
a drain electrode of the MOS transistor is connected with the load.

\* \* \* \* \*